United States Patent
Berg

(10) Patent No.: US 11,186,433 B2
(45) Date of Patent: Nov. 30, 2021

(54) UNDERGROUND STORAGE TANK

(71) Applicant: Robin Berg, Hudson, WI (US)

(72) Inventor: Robin Berg, Hudson, WI (US)

(*) Notice: Subject to any disclaimer, the term of this patent is extended or adjusted under 35 U.S.C. 154(b) by 187 days.

(21) Appl. No.: 16/576,467

(22) Filed: Sep. 19, 2019

(65) Prior Publication Data

US 2021/0086987 A1    Mar. 25, 2021

(51) Int. Cl.
   *B65D 88/76*    (2006.01)

(52) U.S. Cl.
   CPC ................... *B65D 88/76* (2013.01)

(58) Field of Classification Search
   CPC . F24H 1/50; F24H 1/128; F24H 1/125; F24H 1/122; F24H 1/18; F24H 1/181; B60K 2015/03309; B60K 15/03006; B60K 15/03; B65D 88/748; B65D 88/128; B65D 88/76; B65D 90/501
   See application file for complete search history.

(56) References Cited

U.S. PATENT DOCUMENTS

| | | | | |
|---|---|---|---|---|
| 4,830,409 A * | 5/1989 | Freeman | ................ | F16L 47/02 285/104 |
| 4,925,046 A * | 5/1990 | Sharp | ................ | B65D 90/503 220/4.12 |
| 4,927,476 A * | 5/1990 | Watkins | ................ | B29D 23/008 156/173 |
| 4,995,528 A * | 2/1991 | Sharp | ................ | B29D 22/003 220/560.03 |
| 5,017,044 A * | 5/1991 | Sharp | ................ | B65D 88/76 220/4.12 |
| 5,553,734 A * | 9/1996 | Sharp | ................ | B65D 90/505 220/567.1 |
| 6,698,975 B1 * | 3/2004 | Benecke | ................ | E03F 1/003 405/43 |
| 8,091,728 B2 * | 1/2012 | Burwell | ................ | E03B 3/03 220/565 |
| 8,740,005 B1 * | 6/2014 | Holbrook | ................ | B65D 88/06 220/567.1 |
| 8,857,641 B1 * | 10/2014 | Moore, Jr. | ................ | B65D 90/0033 220/4.24 |
| 8,944,275 B2 * | 2/2015 | Schneider | ................ | B65D 88/76 220/565 |
| 2005/0077301 A1 * | 4/2005 | Bolzer | ................ | B65D 88/76 220/567.1 |
| 2018/0201839 A1 * | 7/2018 | McBride | ................ | B65D 90/06 |

\* cited by examiner

*Primary Examiner* — Kareen K Thomas
(74) *Attorney, Agent, or Firm* — The Kelber Law Group; Steven B. Kelber

(57) ABSTRACT

An underground storage tank for the containment of liquids such as gasoline or water is comprised of a cylindrical body with ribs provided about the circumference of the body. The ribs have a cross-section in the nature of a rectangular sine wave. By providing lower ribs, no greater than one half-inch in height above the surface of the cylindrical body, and as much as five or six inches in breath, strength is maintained with a reduction in the amount of material used. The rib may be strengthened against crushing forces by providing linear material of high modulus, such as graphite or carbon fiber, in the upper portion of the rib. The resulting tank can be built to take advantage or recent changes in transportation regulations and may extend up to eight and one half feet, providing for more economical tank manufacture from source to installation.

3 Claims, 4 Drawing Sheets

Double Wall Half Shell

Fig. 1 Prior Art Single Wall Half Shell
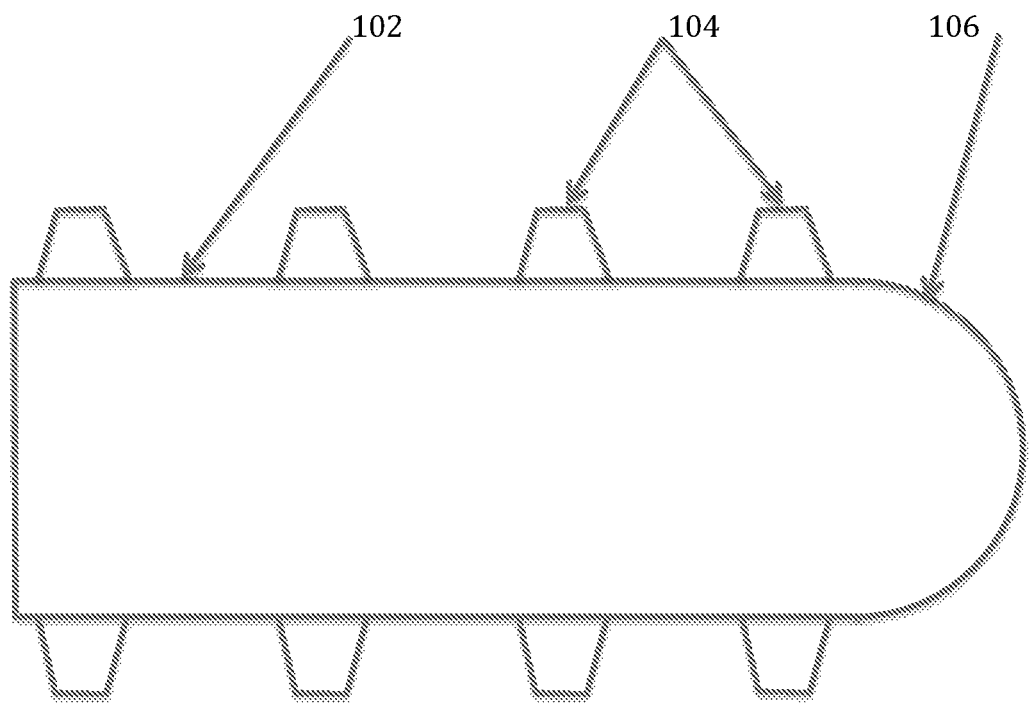

Fig. 2 Single Wall Half Shell
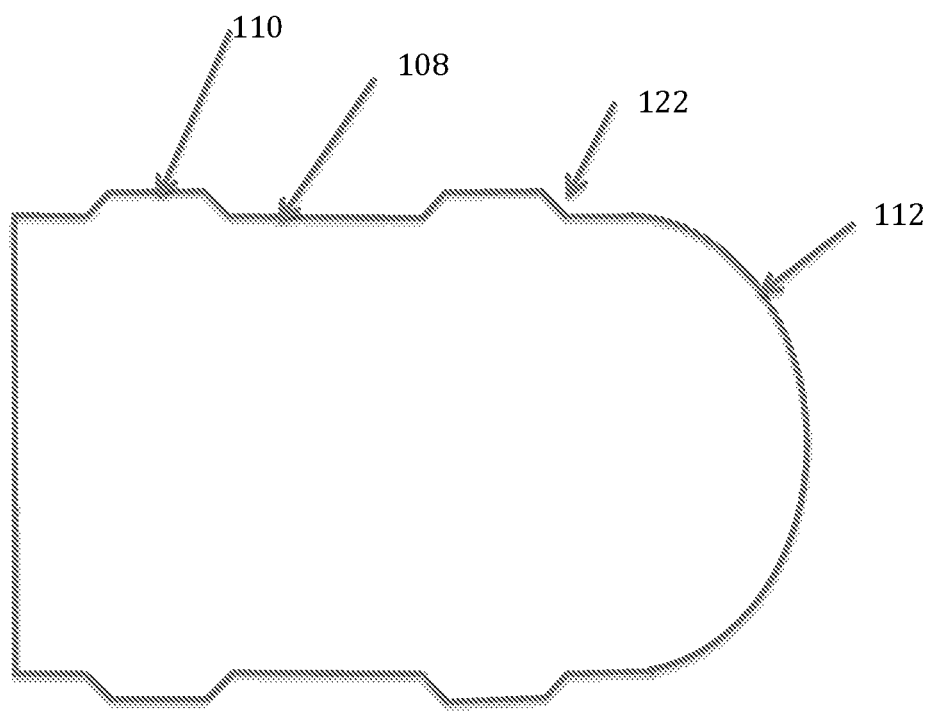

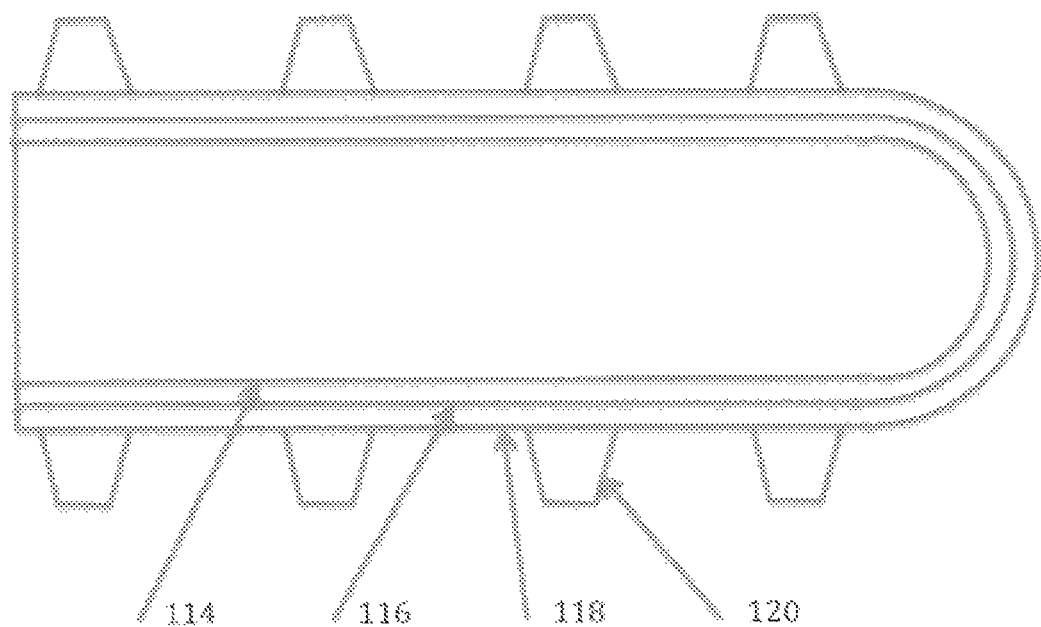
Fig 3 Prior Art Double Wall Half Shell
114  116  118  120

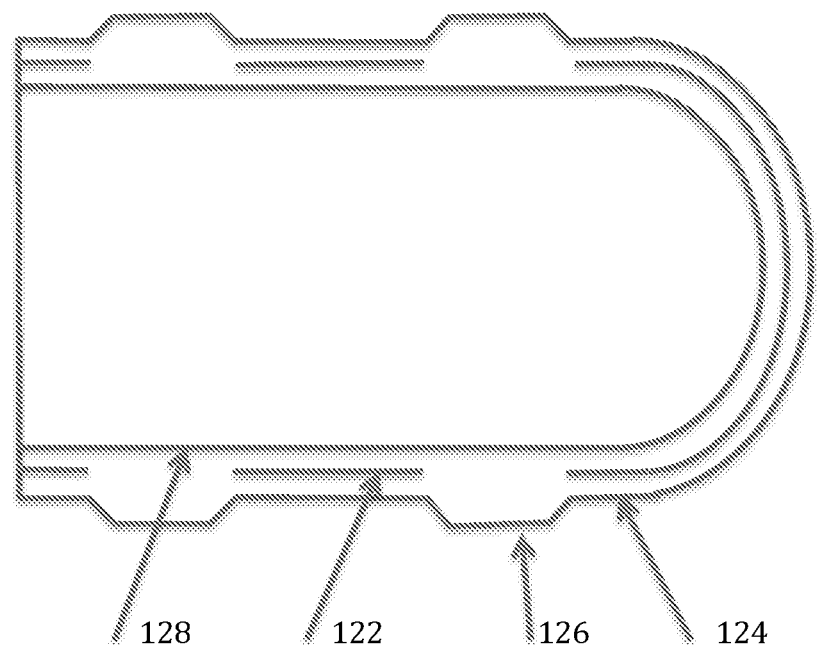
FIG. 4 Double Wall Half Shell

UNDERGROUND STORAGE TANK

BACKGROUND OF THE INVENTION

Field of the Invention

The present invention relates to underground storage tanks for the retention of fluids like gasoline, fuel and water underground containment. Such tanks must meet structural and chemical resistance requirements. They must also satisfy a variety of storage and transportation requirements, so as to be able to be delivered economically to point of use.

Background of the Invention

This invention pertains to underground storage tanks. Such tanks are conventionally used for the containment of various fluids, often pumped from the storage tank upon demand to a recipient, such as the gas tank of an automobile. Early underground storage tanks for water and gasoline were made of a single wall rolled steel with capped ends that were usually in a form of a truncated dome. These tanks had experienced issues with rusting when exposed to water. Oftentimes, sites for installation, such as gas stations, experienced flooding or seepage, threatening rust from the outside. The containment of fluids such as gasoline and water also caused rust and damage from inside the tanks. Such tanks, typically exhibiting a cylindrical shape with flat ends also tended to buckle during earthquakes.

To address issues of rust and water damage, cathodic protection was introduced in the 1950S. This proved to be unsuitable in many applications. Tanks prepared from fiberglass reinforced plastic became popular in the early 1960's. Such tanks were typically comprised of low modulus chopped fiberglass which would be sprayed onto a mold with a thermosetting resin, which would be cured to provide a strong, water and chemical resistant shell. Fiberglass resin can be made to withstand various fuels and different water types. The first fiberglass tanks were made by spraying chopped fiberglass material on a cylindrical rotating steel drum that collapsed slightly when the tank cylinder was being removed. This is called the male mold method. The cylinder by itself would assume an oval shape when free-standing. To provide resistance to crushing forces imposes by ground materials, a "rib" form, typically up to three inches in height, was applied to the outside of the cylinder and then sprayed over with the same fiberglass mat reinforced resin to create stiffening ribs that held the cylinder round after it was removed.

The ribs of an underground storage tank provided a variety of engineering concerns and opportunities. The ribs were stiffened by wrapping the outside layer of the rib with a unidirectional fabric that increases strength and stiffness in the direction of the glass reinforcement. Sand was sifted on the outside layer of the laminate to add additional stiffness and grit that reduces the slippery outside surface—making it safer to walk on the surface during installation and inspection. Elliptical ends were attached to the cylinder to enclose the tank. The attachment joint at the cylinder and ends presented a structural weakness that was solved by making tank half shells with the ends molded into the cylinder. Then the half shells were joined together at the center of the tank length.

Making a rotating half tank mold where the same chopped fiberglass material was sprayed onto the mold from the inside provided a second manufacturing method. This is called the female mold method. The rib shapes were fabricated into the cylindrical portion of the half tank mold along with the dome ends. The rib bases were capped off on the inside to complete the longitudinal cylinder. The mold opens along the centerline and is lifted to permit half shell removal and mold reuse.

Both male and female molding methods provide a tank with hollow ribs on the outside of the cylinder to provide the necessary stiffness as shown in FIG. 1, which illustrates a prior art device. Double wall tanks for gasoline storage became a requirement in the 1980's, due to environmental concerns. An additional wall was added, which provided a material in the interstices between the two walls that allowed fluid to flow between the walls. The second wall was added to the inside of the single wall tanks as shown in FIG. 3, which also illustrates a prior art underground liquid storage tank. Typically, brine or a similar fluid is used between the walls. If the brine level drops which can be detected by monitoring from the outside, a leak is inferred, which can then be detected and repaired thus avoiding extensive environmental damage. The tanks were licensed and made around the world. Over time, tank usage was expanded from gasoline and potable water containment to water treatment, septic systems and other applications Representative tanks of this type have become recognizable around the world. Early non-metallic tanks are illustrated in U.S. Pat. Nos. 3,335,904 and 3,700,512. These underground storage tanks both reflect conventional "ribbed" tanks that exhibit stiffening ribs, to resist crushing forces, that extend three or more inches above the cylindrical wall on which they are formed. A double walled underground storage tank, such as that described above, is reflected in U.S. Pat. No. 4,676,092.

An underground storage tank with a substantially different rib shape was introduced by the inventor of this application in U.S. Pat. No. 6,802,762, assigned to Xerxes Corporation. This design provided high modulus unidirectional strengthening material in the top of the rib, to improve the resistance but reduce overall material use in the tank manufacture. The high modulus linear material was typically graphite or steel fiber. The disclosure of U.S. Pat. No. 6,802,762 is incorporated herein by reference in its entirety, particularly for the disclosure of the use of linear high modulus fibers for rib strength and stiffness.

Manufacture, design and maintenance are not the only issues that impact the cost of underground storage tanks. Typically, storage tanks are manufactured in one of a few sites distributed nationwide and transported by truck to their final destination. The cost of shipment, not simply the tank itself, but associated materials such as straps and deadmen to which the tanks are secured, can influence the total cost of the tank as installed. U.S. Pat. Nos. 6,467,344 and 6,786,689 both discuss approaches to the design and securement of underground storage tanks so as to address the cost of shipping, and thus reduce the overall cost of the tank.

The efficient method of tank transport depends on transport on truck flatbeds. Air shipment is prohibitively expensive, and rail shipment ultimately requires follow on truck shipment, overall at a greater prices. Thus, the maximum permitted width and length of a flatbed truck sets limits on the size of the tank that may be economically made, shipped and installed. International transport in North America was recently changed to permit flatbed of eight and one half feet in width. Most current tanks were shipped in an era where maximum permissible width was eight foot. Tanks vary, in their utility, not on their length but in their volume. A tank that is eight and one half feet in length will have a cost advantage, all other things held equal, with respect to one that is eight feet in length.

Thus, it remains an industry concern to address the cost of manufacture, shipment and installation of an underground storage tank at as low a level as possible, consistent with safety, strength and shipping regulations.

SUMMARY OF THE INVENTION

The goals of this invention are achieved in part by introducing a new rib design suitable for use in either male molded or female molded underground storage tanks made of fiberglass reinforced resin materials. The reduced rib height conserves material used in the construction of the tank. The tank strength may be augmented, wherever necessary, by introduction of linear high modulus material which improves the crush resistance provided by the circular ribs. The resulting tanks may be prepared to take advantage of the new regulations governing shipping by truck, permitting the transportation of an underground storage tank fully 8.5 feet from dome to dome from point of manufacture to point of installation. Where capacity is at a particular premium, the tank may be shipped in two halves, the two single dome segments married at a common centerline upon reaching the installation destination.

The inventive underground storage tanks save substantial material and reduce cost by employing a lower rib. Rather than the typical storage tank which uses a rib in the form of a truncated pyramid of three inches height to provide the necessary crush resistance, the inventive tanks use a lower, broader rib with a cross-section that resembles a rectangular sine wave as illustrated in FIG. 2, which reflects a single walled tank of the claimed invention. The resulting tank can be filled, even to the ribs, with contained fluid without a loss or sacrifice of strength and crush resistance. A similar design can be used in double walled tanks, illustrated in FIG. 4. In the case of the double walled tank, the space between the walls may be filled with brine or other leak-detecting liquid.

The ribs of the inventive tanks have a reduced height, substantially below one inch in height above the tank cylinder. Typical tanks of a length of about 8.5 feet in length will reflect ribs of about one half inch in height. The ribs may be made concomitantly broader, reducing the number of ribs required. The method of manufacture does not change and no new costs will be introduced by those methods.

While any size tank up to the regulated limit can be prepared with these ribs of reduced height, since new molds may be required, the new tanks may take advantage of the new regulations and extend to a full eight and a half foot in length. Clearly, tanks made on existing molds reflecting the improved design will also be acceptable for shipping.

Where desired or required by enhanced regulation or the situation encountered, the improved tank design may be strengthened, particularly with respect to crushing forces by the addition unidirectional fibers to the circular ribs and tank body. Given the predominate use of chopped graphite reinforced resinous materials, graphite fibers do not substantially enhance the strength of the tank. Other linear materials like graphite, carbon, kevlar, boron and synthetic fibers such as polyimide drawn fibers may be added at low material cost and significantly improve strength.

BRIEF DESCRIPTION OF THE DRAWINGS

The drawings appended hereto are intended enhance understanding and characterization of the inventive tanks and their design. Unless indicated to the contrary, any dimensions, amounts and cost figures are approximate only, and not intended to characterize or limit the invention as presented in the claims. An exception to this is the emphasis on ribs of a flatter, broader character. Ribs of the single and double wall tanks of the claimed invention are less than one inch in height.

FIG. 1, as noted above, illustrates a conventional single walled tank used in the prior art. Made of fiberglass reinforced thermosetting resin, the tank features a cylindrical body 102 with ribs 104 extending around the outer circumference 104. The tank ends in rough domes 106.

FIG. 2 illustrates the inventive underground storage tank of this invention. As shown, FIGS. 1 and 2 are intended for comparison as prior art and invention, respectively, as are FIGS. 3 and 4. The inventive single wall storage tank of FIG. 2 features a tank wall 108 provided with ribs 110 of reduced height that smoothly meet the tank wall. Given the greater breadth and reduced height of the rib 110, it no longer needs to be closed off, providing additional storage space for the fluid to be contained. Where desired, high modulus linear reinforcement 122, such as unidirectional glass, graphite or carbon fiber, or similar material, may be provided in the top of rib 110 to enhance strength. Ribs 110 typically have a height of one-half to three quarters of an inch, less than half the height of the conventional ribs of prior art tanks such as that illustrated in FIG. 1.

FIG. 3 illustrates a conventional double walled tank of the prior art, again comprised of fiberglass mat, commonly referred to as "chop", and a thermosetting resin. The inner tank 114 of this double wall construction is again smooth, and features an annulus 116 between the inner tank and outer tank 118. Outer tank 118 presents ribs 120, similar to ribs 104 of the single wall tank. These ribs are closed, and the annulus 116 between the two tanks is filled with leak detecting fluid. The ribs are typically three inches high.

The inventive double walled underground storage tank of FIG. 4 exhibits a smooth interior storage tank 128, surrounding annulus 122 with outer tank 124 there around. To ensure the annulus leak detecting fluid is operative in this embodiment, ribs 126 are closed at the bottom, but may still comprise high modulus linear material to provide additional strength where necessary. Ribs 126 are again broader and shorter than conventional ribs, no more than a half inch in height. Like the ribs of the single walled storage tank of FIG. 2, these ribs exhibit a rectangular sine wave in cross section, and are about one half inch high. The ribs are roughly twice the breadth of ribs 120 of the conventional double walled storage tank of FIG. 3.

DETAILED DESCRIPTION OF THE INVENTION

The chief departure from conventional underground storage tanks as claimed herein are the dimensions of the features of the tank. While the tank itself may be of conventional cylindrical shape with domed end caps, the ribs that provide resistance to crush forces are broader and lower. These ribs, in a single walled tank, may be made of lesser height than conventional prior art ribs. For an 8.5 foot long tank, ribs of about one half inch in height and perhaps 4 inches at their base are suitable. In a double walled tank embodiment that base of the ribs is closed. Given that new molds will be required for either female molded tanks, or new rib forms for male molded tanks will be required, the opportunity is presented to take advantage of new shipping regulations permitting the extension of the tanks to a maximum of 8.5 feet in width, as a single unit. If necessary, the tanks may be prepared as half tanks of up to 8.5 feet in w, and married on site.

The ribs themselves are of a reduced height, and broader than those of prior art tanks. A height of about one half inch provides sufficient strength to resist the crushing forces imposed on a buried tank. The rib exhibits a rectangular sine wave in cross-section. Depending on the precise material employed in cross-section, one of skill in this art, typically a mechanical engineer of a few years' experience can calculate the precise height required. Nonetheless, a height of about one-half inch should be sufficient, since standardized manufacturing is preferred. To the degree necessary, the rib is reinforced with linear high modulus material in the top of the rib. Preferably, the high modulus material is unidirectional glass, carbon or graphite fiber, but other materials are known to those of skill in the art, including boron fibers, polyamide fibers and the like.

The tank may be a double walled tank, as set forth in FIG. 4. In this embodiment, the interior tank is smooth, substantially circular in cross-section, and contained by the outer tank. An annulus lies between the two, which is advantageously filled with a liquid whose height is monitored. If the liquid is heavier than the contained fluid, e.g., gasoline or water, a change in the level of the annular fluid will be indicative of a leak that may be repaired. The outermost tank, sealed now to provide for a contained annulus, features the same sort of improved rib reflected in the single walled tank. The rib cross-section, rather than the truncated pyramid of the prior art ribs, exhibits a rectangular sine wave in cross-section. It rises no more than a half-inch in height above the circular outer wall, and is perhaps five inches in breadth. By providing fewer, broader ribs, which may feature linear high modulus materials to reinforce them, material is conserved.

The improved tanks may be reconfigured to take advantage in changes in the regulation of the trucking industry. Permitted flatbed loads may extend eight and one half feet in width. This then, is the "limiting factor" for the improved underground storage tanks. Where a larger tank is required, tank halves, up to 8.5 feet, may be made and then married, by the use of thermosetting resin and conventional techniques, at the site of installation.

A key feature of this new invention is replacement of conventional rib stiffeners of more than an inch in height with lower, broader ribs that are fewer in number. Where necessary, the strength of the rib may be enhanced by introducing linear high modulus material. This is preferably introduced in the cap of the rib and in the base of the cylinder to enhance performance. There are many different types of such materials known in the art. Typically their price varies with modulus—and the ultimate tank design will select the linear material which best optimizes tank strength and cost. With a rib about one-half inch in height, and perhaps five inches broad, a less expensive tank, with no loss of structural strength, due, where necessary, to incorporation of linear high modulus reinforcement, a substantial savings is realized.

There are areas of improvement that are realized using the improved tank design. These include the wet area diameter and the increased rib efficiency, addressed in turn, below. The prior art standard tank meets old transportation requirements and it would not be worth the cost to retool if that was the only advantage. Our tank has a more efficient rib design that increases the wet area diameter by 50% more than that. The volume of a tank is calculated with the formula:

Volume=Length*pi/4*Diameter squared, the decrease in tank length equals:

$L$(proposed)=$D$(proposed)squared/$D$(existing)square $L$(proposed)=92 inch squared/100 inch squared=85%$L$(existing)

Tank material saving=0.15*Circumference($P$)/Circumference(exist)=0.15%*92/100=13.8% material savings.

The increase in efficiency of the dome would increase the material savings even more. The efficient dome end would become larger too so the cylinder of the standard 26 foot long tank would become 3 feet shorter.

The most efficient rib design is an I beam. The neutral axis is halfway up of down from the top and bottom edges where the maximum strength and stiffness is carried The half ribs of the existing and proposed are diagramed for a single wall tanks are diagramed below. The double wall tank even greater savings but does not have this problem because the inside wall is straight and has more material and therefore stiffer and stronger. The prior art rib has a lot more material than the invention disclosed herein. The top cap is much thicker, the vertical wall is much higher and the material that closes off the bottom of the rib is totally removed. The inventive rib is has way less material but some of the material is unidirectional glass that builds up the effective material. The most efficient beam has the centroid in the middle of the section. It is important that the neutral-axils of the proposed half rib is centered where the existing half rib is in a very inefficient lower position. The neutral axis is the area times the modulus centroid. The effective material in compression is nine times the thickness of the material and the proposed design applies this knowledge. So the maximum effective flange width is nine times the thickness.

The maximum rib height for the single wall tank is determined by the moment of inertia required to carry the end forces applied on the tank. The compression forces are created by water pressure in a wet hole and the tensile forces are created when the tank is filled with water above ground. Thus, in the inventive tank the rib is made more efficient by making the rib caps much wider and by eliminating a rib or two, making the rib caps stronger and stiffer by using unidirectional materials and therefore shorting the rib height which increases the inside diameter of the tank which makes the tank shorter and utilizes less material and labor. These advantages, coupled with the opportunity to take advantage of the expanded restrictions on transportation such that tanks fully eight and one half-feet in dimension may be employed, dramatically reduces the cost of the tank, from manufacture to installation.

What is claimed is:

1. An underground storage tank comprising a cylindrical body terminating at each end in a half dome, wherein said body is comprised of thermosetting resin reinforced with fiberglass, wherein said tank comprises a plurality of annular ribs disposed on an outer surface of said body, each of said ribs exhibiting a rectangular sine wave in cross-section, and no more than one half inch in height above the cylindrical body and wherein said ribs comprise a high strength linear material in the uppermost surface of said ribs which provides stiffening strength for said ribs.

2. A double walled underground storage tank comprising an inner cylindrical body terminating at each end in a half dome, wherein said body is comprised of thermosetting resin reinforced with fiberglass, an outer cylindrical tank surrounding said inner cylindrical tank and spaced therefrom by an annulus there between, wherein said outer cylindrical tank comprises a plurality of annular ribs disposed on an outer surface of said outer cylindrical tank, each of said ribs exhibiting a rectangular sine wave in cross-section, and no more than one half inch in height above the cylindrical body, wherein said annulus is comprised of a leak detecting fluid.

3. The double walled underground storage tank of claim 2, wherein said underground storage tank comprises a monitor which detects changes in the level of said leak detecting fluid, which changes indicate the possible presence of a leak in said double walled underground storage tank.

* * * * *